United States Patent
McColloch

(10) Patent No.: US 7,566,245 B1
(45) Date of Patent: Jul. 28, 2009

(54) ELECTROMAGNETIC INTERFERENCE (EMI) SYSTEM AND METHOD FOR USE WITH AN OPTICAL TRANSCEIVER MODULE

(75) Inventor: Laurence R. McColloch, Santa Clara, CA (US)

(73) Assignee: Avago Technologies Fiber IP (Sinapore) Pte. Ltd., Singapore (SG)

( * ) Notice: Subject to any disclaimer, the term of this patent is extended or adjusted under 35 U.S.C. 154(b) by 0 days.

(21) Appl. No.: 12/027,027

(22) Filed: Feb. 6, 2008

(51) Int. Cl.
*H01R 13/648* (2006.01)

(52) U.S. Cl. .................... 439/607; 439/927

(58) Field of Classification Search ......... 439/607, 439/927; 174/355, 356
See application file for complete search history.

(56) References Cited

U.S. PATENT DOCUMENTS

| 5,766,041 | A | 6/1998 | Morin et al. |
| 6,366,380 | B1 | 4/2002 | Chesavage |
| 6,817,782 | B2 | 11/2004 | Togami et al. |
| 7,159,404 | B2 | 1/2007 | Dudley |
| 7,351,090 | B1 * | 4/2008 | Moore ................. 439/372 |
| 2007/0237489 | A1 * | 10/2007 | Sasser et al. ........... 385/147 |
| 2008/0207039 | A1 * | 8/2008 | Moore et al. ........... 439/346 |

* cited by examiner

*Primary Examiner*—Ross N Gushi

(57) ABSTRACT

An EMI system is provided for use with an optical transceiver module. The EMI system comprises an EMI collar that is secured about the housing of the transceiver module. The EMI collar is configured such that when the collar is secured to the module housing and the module is contained within a cage, features on the EMI collar provide electrically conductive pathways between the module housing and the cage.

11 Claims, 8 Drawing Sheets

ELECTROMAGNETIC INTERFERENCE (EMI) SYSTEM AND METHOD FOR USE WITH AN OPTICAL TRANSCEIVER MODULE

TECHNICAL FIELD OF THE INVENTION

The invention relates to optical transceiver modules. More particularly, the invention relates to an electromagnetic interference (EMI) system for use with a transceiver module.

BACKGROUND OF THE INVENTION

In optical communications networks, optical transceiver modules are used to transmit and receive optical signals over optical fibers. On the transmit side of a transceiver module, a light source (e.g., a laser diode) generates amplitude modulated optical signals that represent data, which are received by an optics system of the transceiver module and focused by the optics system into an end of a transmit optical fiber. The signals are then transmitted over the transmit fiber to a receiver node of the network. On the receive side of the transceiver module, the optics system of the transceiver module receives optical signals output from an end of a receive optical fiber and focuses the optical signals onto an optical detector (e.g., a photodiode), which converts the optical energy into electrical energy.

The transmit and receive fiber cables have connectors on their ends, often LC connectors, that are adapted to mate with transmit and receive receptacles, respectively, formed in the transceiver module. A variety of optical transceiver module configurations are used in optical communications network. Some optical transceiver modules have multiple transmit receptacles and multiple receive receptacles for connecting multiple receive and transmit fiber cables to the module. Some transceiver modules having a single receive receptacle and a single transmit receptacle arranged side by side for connecting a single receive fiber cable and a single transmit fiber cable, respectively, to the transceiver module.

The transceiver modules themselves also have mating elements on them that are adapted to mate with mating elements formed on the cages. The cages are contained in racks, and each rack typically includes many cages that are arranged in very close proximity to one another. Each of these cages is configured to receive a transceiver module on the front side of the rack through a front panel of the rack. The transceiver modules are configured so that they may be inserted into and removed from the cages. The modules typically include latching mechanisms that couple to mating features on the cages when the modules are inserted into the cages. In order to remove a module from a cage, the module must be de-latched to decouple the latching mechanism from the features on the cage, which can be challenging when the modules are spaced closely together in the racks.

A variety of different latching mechanism configurations are used on optical transceiver modules. In general, latching mechanisms used on optical transceiver modules include spring loading elements that maintain the latching mechanisms in their locked positions via spring forces. These types of latching mechanisms typically include a bail that is moved to a locked position in order to latch the module to the cage and that is moved to an unlocked position in order to de-latch the module from the cage. When the bail is in the locked position, a latch lock pin extends through an opening formed in the cage to prevent movement of the module relative to the cage and relative to the LC connectors connected to the transmit and receive receptacles. When the bail is in the locked position, the latch lock pin is retracted from the opening formed in the cage, making it possible to remove the module from and insert the module into the cage.

In most optical transceiver module designs, the area around the latching mechanism, and in particular, the opening formed in the module housing with for receiving the latch lock pin, constitute areas that allow electromagnetic interference (EMI) to escape from the transceiver module housing. The Federal Communications Commission provides standards that limit the amount of electromagnetic radiation that may emanate from unintended sources. A variety of techniques and designs are used to shield EMI openings in the transceiver module housings in order to limit the amount of EMI that passes through openings in the transceiver module housing. For example, various metal shielding designs and resins that contain metallic material have been used to cover areas from which EMI may escape from the housings. So far, the known techniques and designs have had only limited success, especially with respect to transceiver modules that transmit and receive data at very high data rates, e.g., 10 gigabits per second (Gbits/sec).

Accordingly, a need exists for an optical transceiver module having an EMI system that is satisfactory at shielding EMI openings in transceiver module housings.

SUMMARY OF THE INVENTION

The invention provides an EMI system and method for use with an optical transceiver module. The EMI system includes an EMI collar that is configured to be secured to the housing of the transceiver module. The EMI collar has an opening formed therein through which a latch lock pin of a latching bail mechanism is inserted and retracted. The configuration of the EMI collar includes one or more electrically conductive elements that provide one or more electrically conductive pathways between the module housing and a cage if the optical transceiver module is contained within the cage.

The method comprises providing an EMI collar for use with an optical transceiver module and securing the EMI collar to an optical transceiver module. The EMI collar has an opening formed therein through which a latch lock pin of a latching bail mechanism is inserted and retracted. The configuration of the EMI collar includes one or more electrically conductive elements that provide one or more electrically conductive pathways between the module housing and a cage if the optical transceiver module is contained within the cage.

These and other features and advantages of the invention will become apparent from the following description, drawings and claims.

DETAILED DESCRIPTION OF AN ILLUSTRATIVE EMBODIMENT

In accordance with various embodiments that will be described herein, an optical transceiver module is provided that has an EMI collar that is secured about the housing of the transceiver module. The EMI collar is configured such that when the collar is secured to the module housing and the module is contained within a cage, features on the EMI collar provide electrically conductive pathways between the module housing and the cage. Prior to describing the EMI collar in detail, a transceiver module with which the EMI collar may suitably be used and a cage that is configured to receive the transceiver module will be described in detail. However, the EMI collar is not limited to be used with this particular transceiver module or cage. The EMI collar may be used with various transceiver module designs and cage designs, as will be apparent to those of ordinary skill in the art in view of the description being provided herein.

Figure 1:
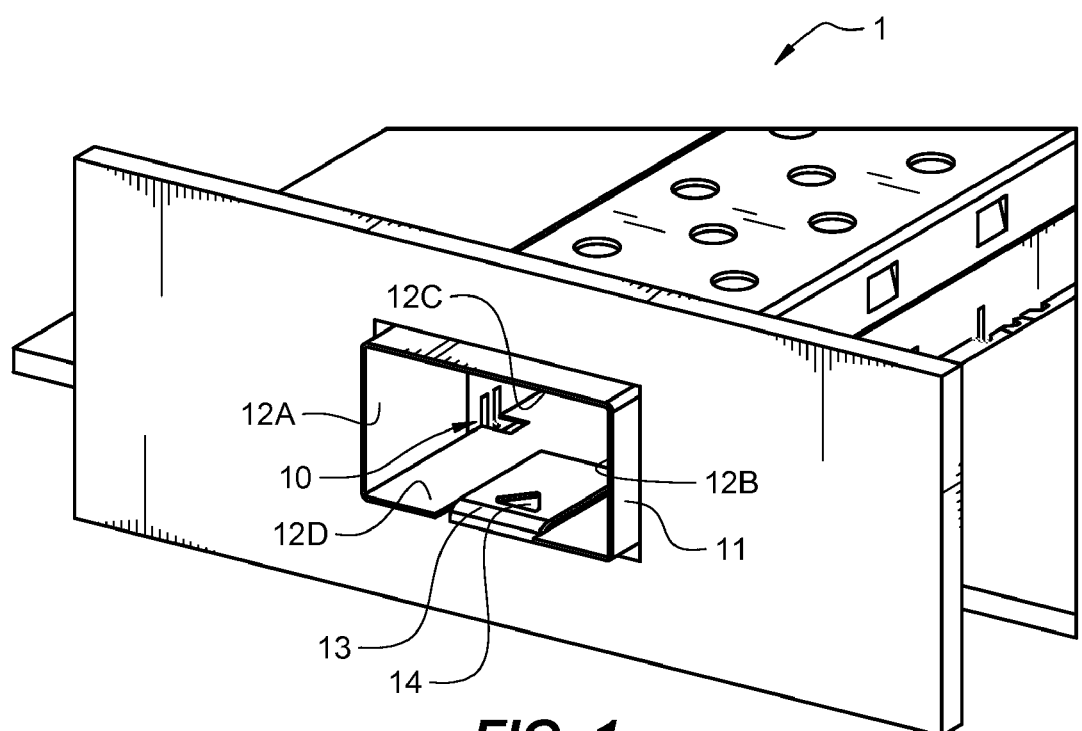
FIG. 1 illustrates a perspective view of a portion of the front side of a rack having a cage secured thereto that is suitable for receiving the transceiver module of the invention.

FIG. 1 illustrates a perspective view of a portion of the front side of a rack 1 having a known cage 10 secured thereto. The cage 10 is typically made of a flexible material, such as sheet metal for example, although other materials, such as die cast zinc may be used for the cage 10. Typically, the rack 1 will contain many such cages mounted one atop the other and side by side in close proximity to one another. The cage 10 has an interior compartment for receiving the transceiver module (not shown) through a front face 11 of the cage 10. The interior compartment of the cage 10 is defined by first and second side walls 12A and 12B, respectively, and top and bottom walls 12C and 12D, respectively. The cage 10 has a leaf spring finger 13 formed on the bottom wall 12D, which is typically made of sheet metal, and a catch 14 formed in the cage latch 13. The catch 14 is an opening shaped to receive a latch lock pin (FIG. 2B, item 40A) of the latching bail mechanism, as will be described below with reference to FIG. 2B. The catch opening 14 is one of, if not the most, important openings in the module in terms of constituting an EMI opening.

Figure 2A:
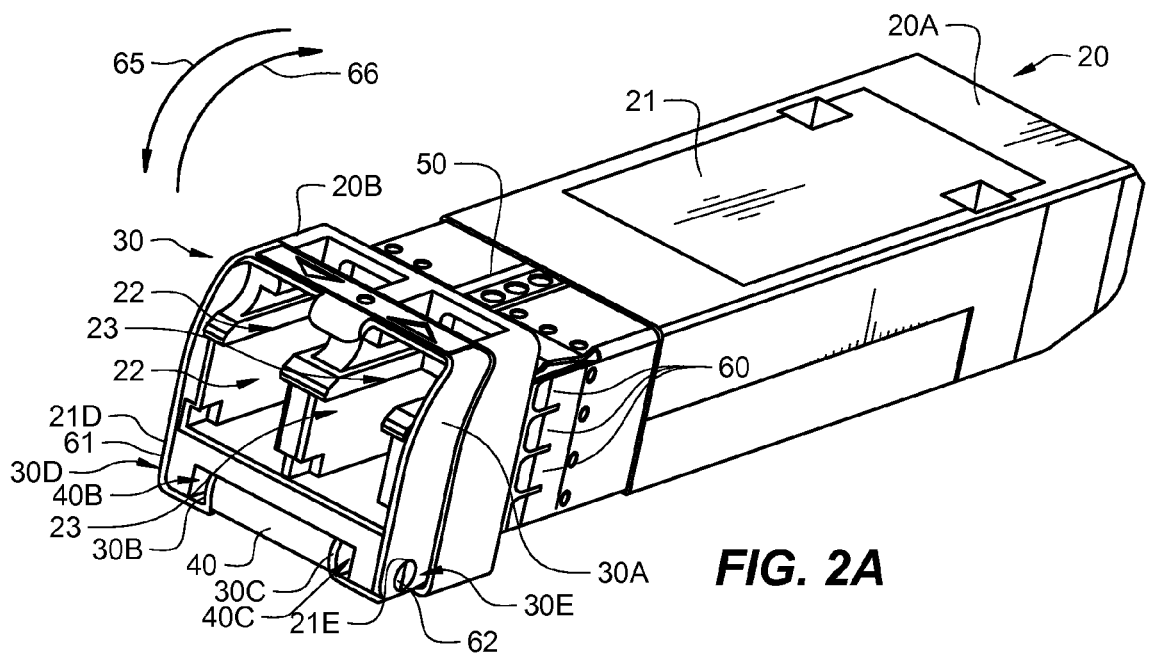
FIG. 2A illustrates a perspective top view of a portion of the transceiver module of the invention in accordance with an illustrative embodiment, which shows the latching bail mechanism of the transceiver module in the locked position.

FIG. 2A illustrates a perspective top view of a portion of the transceiver module 20 of the invention in accordance with an illustrative embodiment, which shows the latching bail mechanism 30 of the transceiver module 20 in the locked position. In the locked position, the bail 30A of the latching bail mechanism 30 is in the upright position shown. The latching bail mechanism 30 is typically made of sheet metal, although other materials, such as molded plastic, for example, may be used for this purpose. Likewise, the transceiver module housing 21 is typically made of sheet metal, although other materials, such as molded plastic, for example, may be used to make the transceiver module 20. The transceiver module 20 also includes the EMI collar 50, which is made of conductive material and has periodically spaced conductive elements 60 thereon for absorbing electromagnetic radiation emanating from within the module 20, and especially at the catch opening 14 (FIG. 1).

The transceiver module housing 21 has a proximal end portion 20A and a distal end portion 20B. When the transceiver module housing 21 is inserted into the cage 10 (FIG. 1), the proximal end portion 20A enters the cage 10 first. The transmit and receive receptacles 22 and 23, respectively, remain exposed through the front face 11 of the cage 10 to enable connectors (not shown) disposed on the ends of optical fibers (not shown) to be connected to the receptacles 22 and 23 of the module 20. The connectors are typically LC connectors, although other types of connectors may be used. The latching bail mechanism 30 includes a latch base 40 having male rotational coupling devices 40B and 40C that are received in and mate with female rotational coupling mechanisms 30B and 30C formed in the interior surfaces of the bail 30A. The male rotational coupling mechanism 40B and 40C formed in the latch base 40 are cylindrically shaped pins formed on proximal and distal ends of an axis about which the bail 30A rotates as it is moved from the locked position to the unlocked position, and vice versa.

The bail 30A has circular openings 30D and 30E formed in the outer surfaces thereof that receive tapered pins 21D and 21E, respectively, formed on the module housing 21. The latching bail mechanism 30 is secured to the module housing 21 by inserting the pins 21D and 21E into the circular openings 30D and 30E and then inserting the dowels 61 and 62 into the openings 30D and 30E, respectively. The bail 30A is then free to move in an arcuate manner in the downward and upward directions represented by arrows 65 and 66, respectively, through the rotational movement of the openings 30D and 30E about the pin/dowel pairs 61/21D and 62/21E, respectively.

Figure 2B:
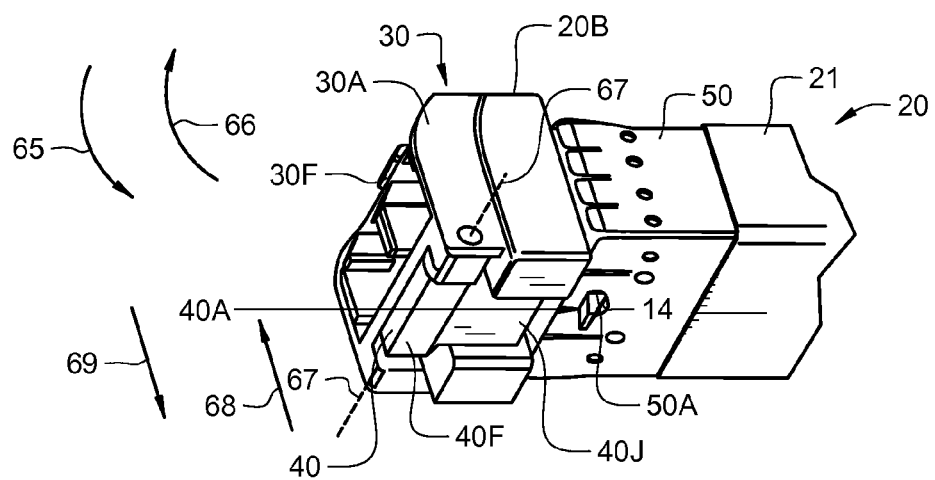
FIG. 2B illustrates a perspective bottom view of a portion of the transceiver module shown in FIG. 2A, which shows the latching bail mechanism in the locked position depicted in FIG. 2A.

FIG. 2B illustrates a perspective bottom view of a portion of the transceiver module 20 shown in FIG. 2A, which shows the latching bail mechanism 30 in the locked position depicted in FIG. 2A. In the locked position, the latch lock pin 40A is fully extended down through the opening forming the catch 14 in the cage 10 (FIG. 1) and through an opening 50A formed in the EMI collar 50. When the bail 30A is moved toward the locked position shown in FIGS. 2A and 2B, the female rotational coupling mechanisms 30B and 30C move along an axis that is eccentric relative to an imaginary axis 67 that passes through the centers of the circular openings 30D and 30E formed in the outer surfaces of the bail 30A. The movement is in the direction indicated by arrow 66 and the eccentric access is parallel to axis 67. This eccentric movement of the female rotational coupling mechanisms 30B and 30C causes the pins 40B and 40C that are disposed on the latch base 40 and coupled with the female rotational coupling mechanisms 30B and 30C, respectively, to also move eccentrically relative to the imaginary axis 67 in the direction of arrow 66. This, in turn, causes the proximal end 40F of the latch base 40 to be moved in the upward direction represented by arrow 68.

For reasons that will be described in more detail below with reference to FIGS. 5-6B, when the proximal end 40F of the latch base 40 is moved in the upward direction indicated by arrow 68, this movement causes the latch lock pin 40A disposed on the distal end 40J of the latch base to be forced down through the openings 14 and 50A. Thus, when the proximal end 40F of the latch base 40 cannot be moved any farther in the direction indicated by arrow 68, the latch lock pin 40A is in its fully extended position. In this position, any forces exerted on the module housing 21 that are transferred to the latch lock pin 40A are then transferred to the housing 21, where they are absorbed, as will be described below in detail with reference to FIGS. 5-6B.

When the bail 30A is moved to the unlocked position by moving the bail 30A in the downward direction represented by arrow 65, the female rotational coupling mechanisms 30B and 30C move along an axis that is eccentric relative to the imaginary axis 67 that passes through the centers of the circular openings 30D and 30E formed in the exterior surfaces of the bail 30A. This eccentric movement of the female rotational coupling mechanisms 30B and 30C is in the direction indicated by arrow 65. This eccentric movement causes the pins 40B and 40C that are disposed on the latch base 40 and coupled with the female rotational coupling mechanisms 30B and 30C, respectively, to also move along the axis that is eccentric relative to the imaginary axis 67 in the direction of arrow 65. This, in turn, causes the proximal end 40F of the latch base 40 to be moved in the downward direction represented by arrow 69.

For reasons that will be described in more detail below with reference to FIGS. 5-6B, when the proximal end 40F of the latch base 40 is moved in the downward direction indicated by arrow 69, this movement causes the latch lock pin 40A disposed on the distal end 40J of the latch base 40 to retract through the openings 14 and 50A. Movement of the proximal end 40F of the latch base 40 in one direction produces movement of the distal end 40J of the latch base 40 in the opposite direction. Thus, the distal end 40J of the latch base 40 cannot be moved any farther due to abutment with the lower surface of the housing 21, the latch lock pin 40A is in its fully retracted position, as will be described below in detail with reference to FIGS. 5-6B.

Figure 3:
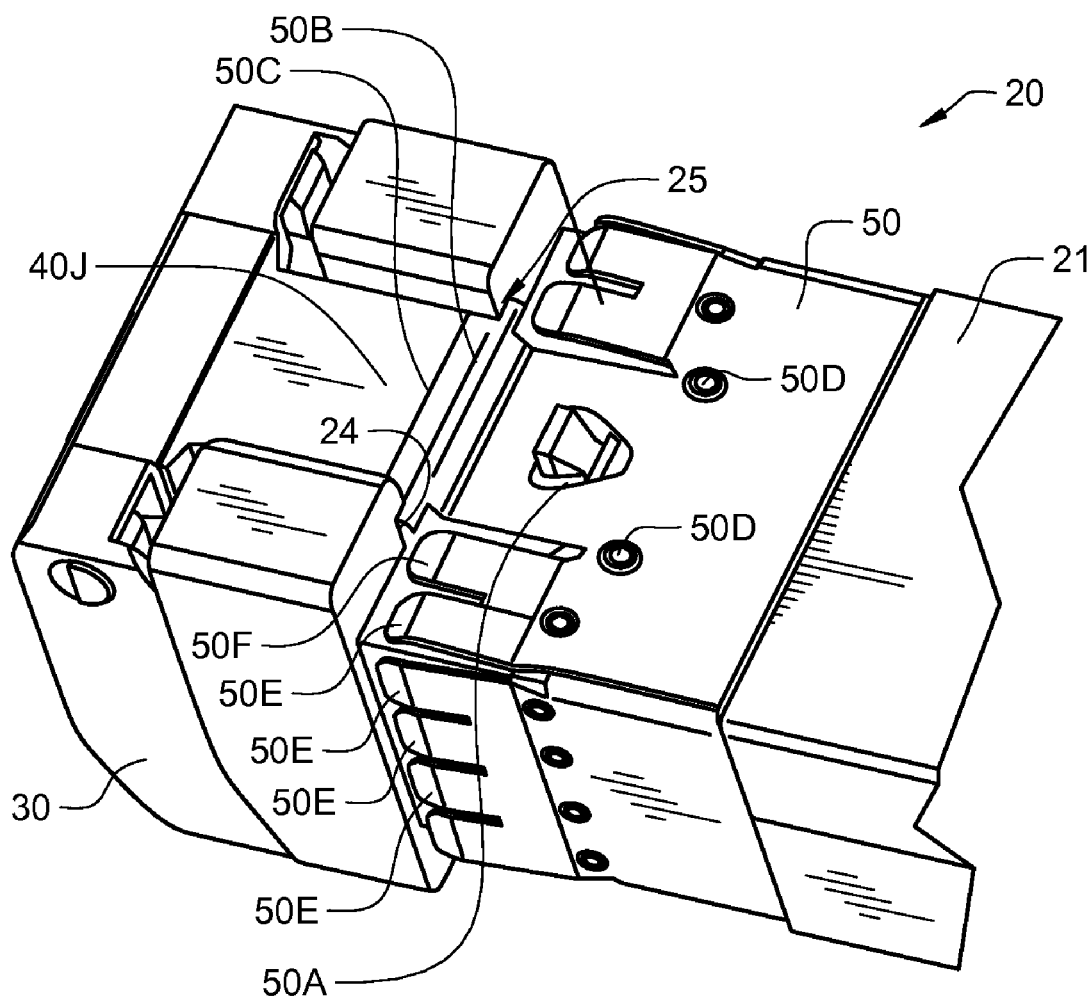
FIG. 3 illustrates a bottom perspective view of a portion of the transceiver module that more clearly shows the features of the EMI collar shown in FIGS. 2A and 2B and the locations at which the EMI collar is in contact with the housing and the latching mechanism.

FIG. 3 illustrates a bottom perspective view of a portion of the transceiver module 20 shown in FIG. 2B that more clearly shows the features of the EMI collar 50 and the locations where the EMI collar 50 and the module housing 21 are in contact with each other. The EMI collar 50 includes a bent portion 50B having a ridge shape. When the collar 50 is secured to the housing 21, the bottom portion of the distal end 40J of the latch base 40 is adjacent the bent portion 50B of the collar 50. The end 50C of the bent portion 50B of the collar 50 is locked within channels 24 and 25 formed in opposite sides of the housing 21 when the collar 50 is secured to the housing 21.

The latching mechanism 30 is installed in the module housing 21 by dropping the latch base 40 into the housing vertically from the bottom of the housing 21 and then securing the collar 50 to the housing 21. Insertion of the end 50C of the bent portion 50B into the channels 24 and 25 formed in the housing 21 locks the collar 50 in place. This is an advantage over other transceiver module designs in which a portion of the transceiver module housing forms the pivot point on which the latching bail mechanism pivots. Such designs generally require a complex path in the housing for inserting the latching bail mechanism into the housing. In contrast, as will be described in more detail below with reference to FIGS. 5-6B, because the latching bail mechanism 30 pivots on the collar 50 rather than on a portion of the housing 21, the bottom of the housing 21 can be left open to allow the latching bail mechanism 30 to be inserted therein. This feature of the invention provides advantages in terms of greater tolerances and ease of assembly.

The EMI collar 50 also includes electrically conductive bumps 50D located near the opening 50A. As will be described below with reference to FIG. 4, these bumps 50D are in electrical contact with the metal latch 13 of the cage 1 (FIG. 1) when the transceiver module 20 is contained within the cage 1. This electrical contact between the bumps 50D and the latch 13 of the cage 1 improves EMI sealing around the catch opening 14 formed in the cage 1 and the opening 50A formed in the collar 50. In addition, the collar 50 includes spring fingers 50E that are periodically spaced at predetermined intervals to provide electrical contact points between the housing 21 and the cage 1 at predetermined spatial intervals. The fingers 50E have folds 50F formed in them that bias the fingers toward the housing 21. When the transceiver module 20 is contained within the cage 1, the folds 50F are in electrical contact with the inner surface of the cage 1.

Figure 4:
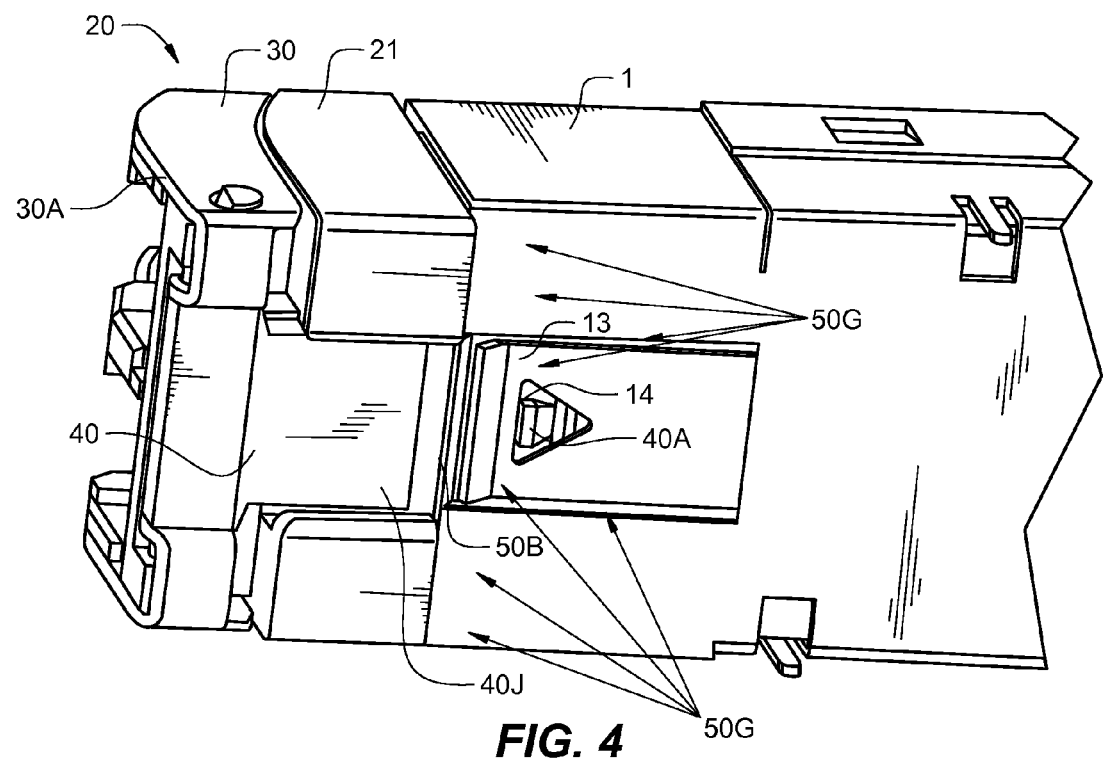
FIG. 4 illustrates a bottom perspective view of a portion of the transceiver module shown in FIG. 3 with the transceiver module secured to the cage shown in FIG. 1.

FIG. 4 illustrates a bottom perspective view of a portion of the transceiver module 20 shown in FIG. 3, which illustrates the transceiver module 20 secured within the cage 1 shown in FIG. 1. The bail 30A of the latching bail mechanism 30 is shown in the locked position, and so the latch lock pin 40A is shown in its fully extended position. The only portion of the EMI collar 50 that is visible in FIG. 4 is the bent portion 50B of the collar 50, which is locked within the channels 24 and 25 (FIG. 3) formed in the housing 21 and which is in abutment with the bottom portion of the distal end 40J of the latch base 40. The latch 13 of the cage 1 is in contact with the collar 50 at locations 50G on the collar 50, which correspond to the locations of the folds 50F in the fingers 50E of the collar 50 and the locations of the bumps 50D on the collar 50, as shown in FIG. 3. Again, these regularly spaced electrical contact points between the collar 50 and the cage 1 result in regularly spaced electrical contact points between the housing 21 and the cage 21, which improves EMI shielding.

Figure 5:
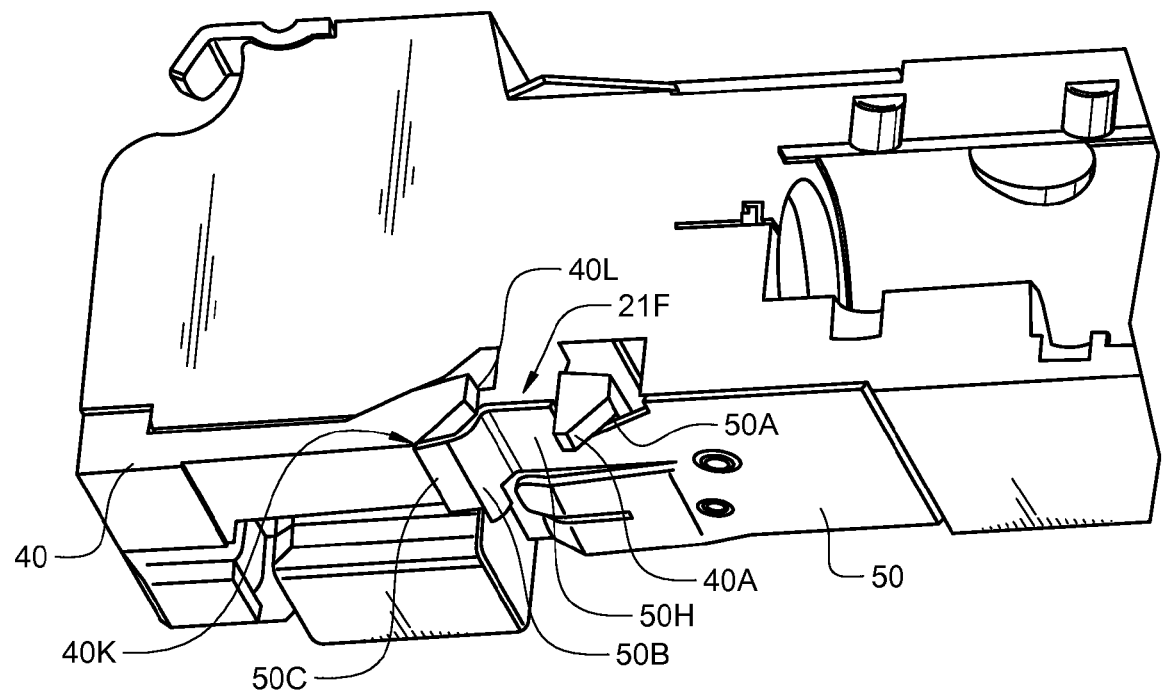
FIG. 5 illustrates a bottom/side perspective view of a cross-section of the transceiver module shown in FIGS. 2A and 2B that depicts the transmit side of the module when the latching bail mechanism is in the locked position.

FIG. 5 illustrates a bottom/side perspective view of a cross-section of the transceiver module 20 shown in FIGS. 2A and 2B and depicts the transmit side of the module when the latching bail mechanism 30 is in the locked position. As stated above, in other known transceiver module designs, the latching bail mechanism pivots against the module housing, which generally results in a complex insertion path being needed in the transceiver module housing for insertion of the latching bail mechanism into the housing. In contrast, the latching bail mechanism 30 shown in FIG. 5 pivots against the EMI collar 50 rather than the housing 21 when the bail 30A (not shown) is being moved from the locked position to the unlocked position. Specifically, when the bail 30 is moved in the direction indicated by arrow 65 shown in FIG. 2B to move it from the locked position to the unlocked position, the location 40K on the bottom surface of the latch base 40 abuts the end 50C of the bent portion 50B of the collar 50. When this happens, the location 40K becomes the pivot point for the latch base 40 such that further movement of the bail 30 in the direction of arrow 65 shown in FIG. 2B causes the distal end 40J of the latch base 40 to move in the direction indicated by arrow 68 in FIG. 2B. Movement of the distal end 40J of the latch base 40 in this direction causes the latch lock pin 40A to be retracted.

As will be described below in more detail with reference to FIGS. 6A and 6B, the housing 21 includes a feature 21F that extends through an opening 40L formed in the latch base 40 and abuts a portion 50H of the collar 50 located between the opening 50A and the bent portion 50B. The feature 21F acts as a boss that prevents the collar 50 and the latch 13 (FIG. 4)

of the cage 1 (FIG. 4) from following the latch lock pin 40A up when the latch lock pin 40A is retracted.

Figure 6A:
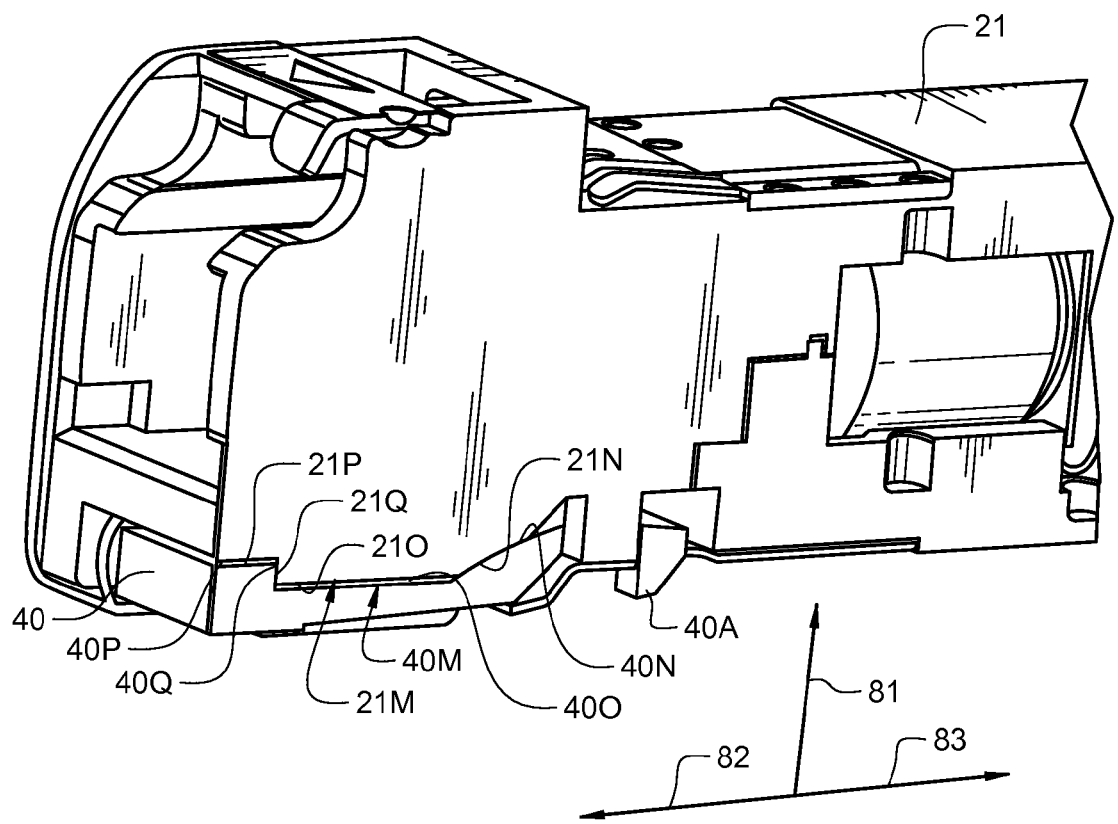
FIG. 6A illustrates a front/side perspective view of a cross-section of the transceiver module shown in FIGS. 2A and 2B that depicts the transmit side of the module when the latching bail mechanism is in the locked position.

FIG. 6A illustrates a front/side perspective view of a cross-section of the transceiver module 20 shown in FIGS. 2A and 2B that depicts the transmit side of the module 20 when the latching bail mechanism 30 is in the locked position. The latch base 40 includes a boss pocket 40M that mates with a boss 21M formed on the lower surface of the module housing 21 when the latching bail mechanism 30 is in the locked position. In this position, if a force is exerted on the lock pin 40A in the upward direction indicated by arrow 81, in the outward direction indicated by arrow 82, in the inward direction indicated by arrow 83, or in any upward or inward and outward direction between the directions indicated by arrows 81, 82 and 83, the resultant force will be transferred as follows: from the lock pin 40A to the boss pocket 40M formed in the latch base 40; from the boss pocket 40M to the boss 21M; and from the boss 21M to other portions of the housing 21 where the force is then be absorbed.

For example, a force exerted on the latch lock pin 40A in the outward direction indicated by arrow 82 will be transferred from surface 40N of the boss pocket 40M to surface 21N of the boss 21M. A force exerted on the latch lock pin 40A in the upward direction indicated by arrow 81 will be transferred from surfaces 40N, 40O and 40P of the boss pocket 40M to surfaces 21N, 21O and 21P, respectively, of the boss 21M. A force exerted in the inward direction indicated by arrow 83 will be transferred from surface 40Q of the boss pocket 40M to the surface 21Q of the boss 21M. Any force exerted in an upward-and-outward direction (arrows 81 and 82) will be transferred from surfaces 40N, 40O and 40P of the boss pocket 40M to surfaces 21N, 21O and 21P, respectively, of the boss 21M. Any force exerted in an upward-and-inward direction (arrows 81 and 83) will be transferred from surfaces 40N, 40O, 40P and 40Q of the boss pocket 40M to surfaces 21N, 21O, 21P and 21Q, respectively, of the boss 21M. In all cases, the forces transferred from the boss pocket 40M to the boss 21M are then transferred from the boss 21M to other portions of the module housing 21, where they are absorbed. Consequently, no force exerted on the latch lock pin 40A is transferred to the bail 30A of the latching bail mechanism 30 (FIGS. 2A and 2B).

Figure 6B:
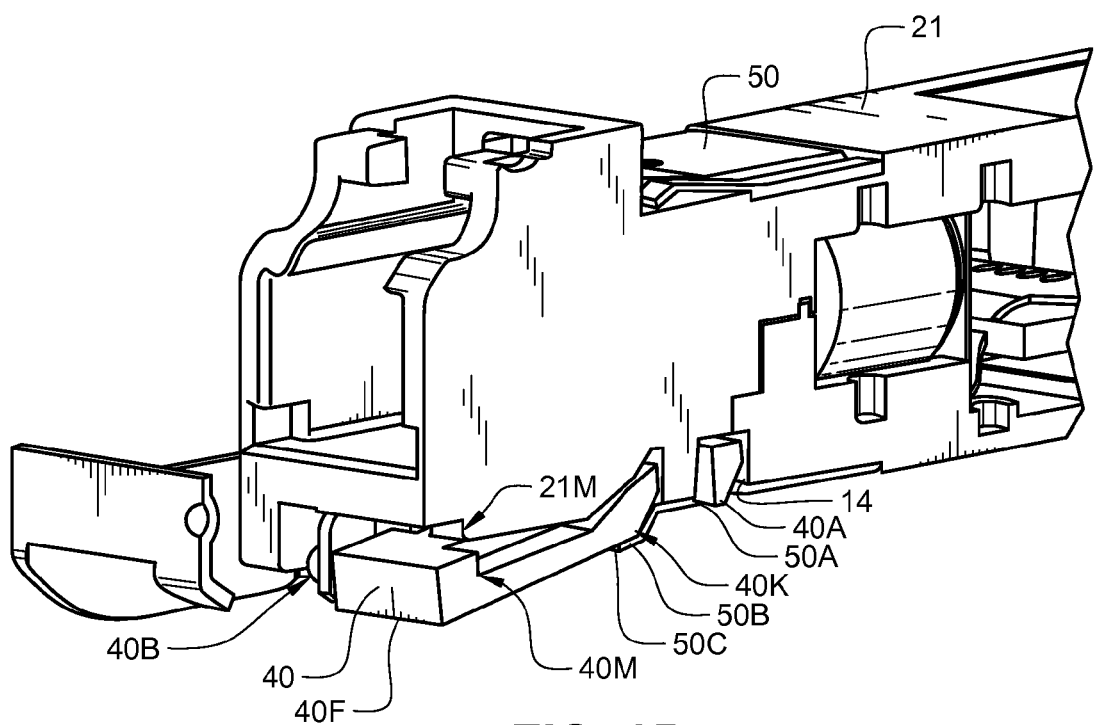
FIG. 6B illustrates a front/side perspective view of a cross-section of the transceiver module shown in FIGS. 2A and 2B that depicts the transmit side of the module when the latching bail mechanism is in the unlocked position.

FIG. 6B illustrates a perspective view of a cross-section of the transceiver module 20 shown in FIGS. 2A and 2B that depicts the transmit side of the module 20 when the latching bail mechanism 30 is in the unlocked position. When the bail 30A (FIG. 2A) is moved in the downward direction (arrow 65, FIG. 2A), the boss 21M formed on the lower surface of the module housing 21 and the boss pocket 40M formed in the latch base 40 are decoupled from each other, and the proximal end 40F of the latch base 40 is moved in downward direction (arrow 69 FIG. 2B). As the proximal end 40F of the latch base 40 is moved in this direction, the location 40K on the lower surface of the latch base 40 comes into contact with the end 50C of the bent portion 50B of the collar 50. When this happens, the location 40K acts as a pivot point about which the latching bail mechanism 30 attempts to rotate. This pivotal movement causes the rotational coupling mechanisms 40B and 40C (not shown) to be forced in the downward direction and causes the latch lock pin 40A to retract in the upward direction through the catch opening 14 (FIG. 4) and the opening 50A formed in the EMI collar 50 to the fully retracted position depicted in FIG. 6B.

Figure 7:
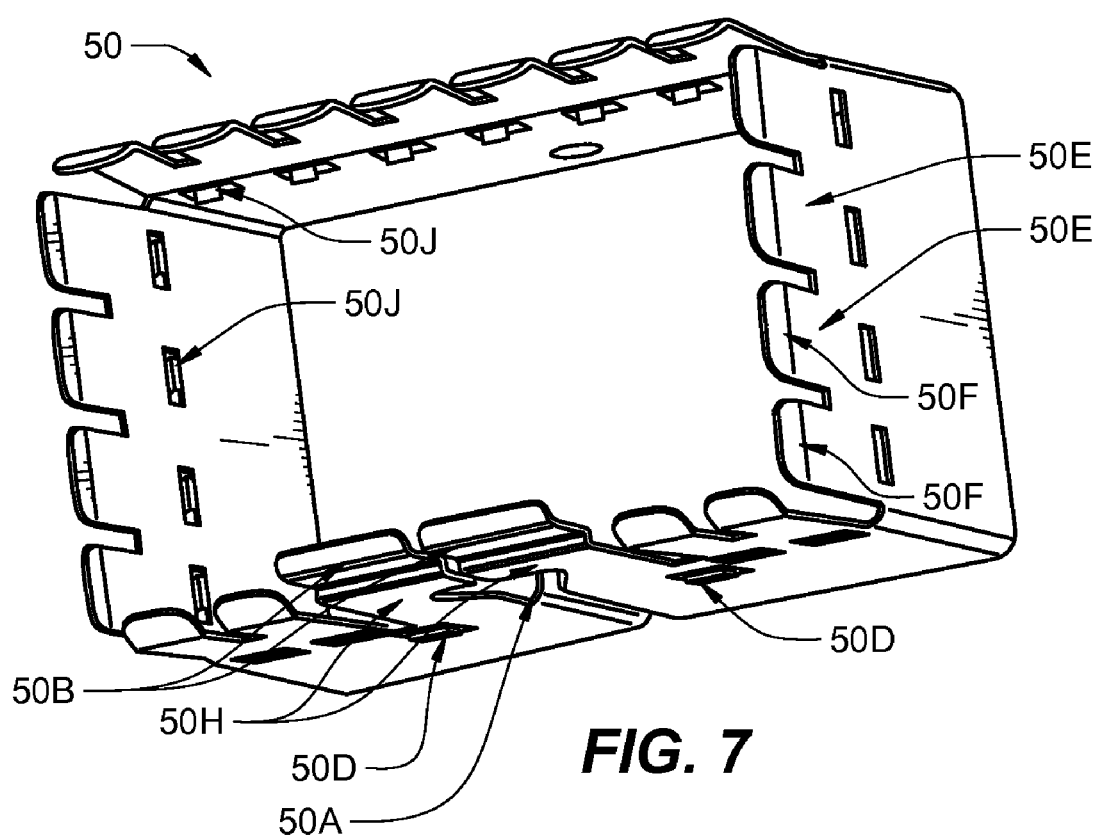
FIG. 7 illustrates a front perspective view of the EMI collar shown in FIGS. 2A-6B in accordance with an embodiment.

FIG. 7 illustrates a front perspective view of the EMI collar 50 shown in FIGS. 2A-6B in accordance with an embodiment. As described above with reference to FIG. 3, the EMI collar 50 includes electrically conductive bumps 50D located near the opening 50A that are in electrical contact with the metal latch 13 of the cage 1 (FIG. 1) when the transceiver module 20 is contained within the cage 1. This electrical contact between the bumps 50D and the latch 13 of the cage 1 improves EMI sealing around the catch opening 14 formed in the cage 1 and the opening 50A formed in the collar 50. The collar 50 includes spring fingers 50E that are periodically spaced at predetermined spatial intervals to provide electrical contact points between the housing 21 and the cage 1 at predetermined spatial intervals. The fingers 50E have folds 50F formed in them that bias the fingers toward the housing 21. When the transceiver module 20 is contained within the cage 1, the folds 50F are in electrical contact with the inner surface of the cage 1. The shape of area 50H around the opening 50A in the collar ensures that good electrical connection exists between the collar 50 and the latch 13 of the cage 1 (FIGS. 1 and 4). The ends 40C of the bent portions 50B come into contact with the pivot area 40K (FIGS. 5 and 6B) on the latch base 40 to provide the pivotal action that causes the latch lock pin 40A to move to its retracted position. The inwardly projecting fingers 50J are periodically spaced to provide consistently repeated periodic electrical contact with the module housing 21. The folds 50F are in conductive contact with the cage 1 at predetermined spatial intervals and the fingers 50E and 50J are in contact with the module housing 21 at predetermined spatial intervals. The combination of all of these features of the collar 50 provides the transceiver module 20 with improved EMI shielding over that achievable by known EMI systems.

It should be noted that the invention has been described with reference to a few illustrative embodiments for the purposes of demonstrating the principles and concepts of the invention and the manner in which they may be implemented. The invention is not limited to these embodiments, but rather, a variety of modifications may be made to these embodiments without deviating from the scope of the invention. For example, although the entire EMI collar has been described above as being made of an electrically conductive material, it is possible to that some portions of the collar might be made of non-electrically conductive material. Those skilled in the art will understand the manner in which modifications may be made to the embodiments described herein and that all such modifications are within the scope of the invention.

What is claimed is:

1. An electromagnetic interference (EMI) system for use with an optical transceiver module, the EMI system comprising:
    an EMI collar configured to be secured to a housing of the optical transceiver module, the EMI collar having an opening formed therein that is configured to allow a latch lock pin of a latching mechanism of the transceiver module to be inserted through and retracted through the opening; and
    wherein the configuration of the EMI collar includes one or more electrically conductive elements that provide one or more electrically conductive pathways between the module housing and a cage if the EMI collar is secured to the housing and the optical transceiver module is contained within the cage, said one or more electrically conductive elements of the EMI collar include spring fingers that are spaced apart at predetermined fixed spatial intervals about a circumference of the EMI collar, each spring finger having a fold formed therein that biases a tip of the spring finger into electrically conductive contact with the module housing when the EMI collar is secured to the module housing, and wherein if the optical transceiver module has the EMI collar secured thereto and is contained within the cage, each fold is in electrically conductive contact with the cage, said one or more electrically conductive elements of the EMI collar include one or more electrically conductive bumps, and wherein if the EMI collar is secured to the housing of the transceiver module and the optical transceiver module is contained within a cage, said one or more electrically conductive bumps are in contact with a latch of the cage.

2. The EMI system of claim 1, wherein said one or more electrically conductive elements of the EMI collar include one or more electrically conductive fingers that project inwardly toward the module housing when the collar is secured to the housing, and wherein the inwardly projecting fingers are spaced apart at predetermined fixed spatial intervals about a circumference of the EMI collar such that when the collar is secured to the module housing and the module is inserted into a cage, the inwardly projecting fingers provide electrically conductive pathways between the module housing and the cage.

3. The EMI system of claim 1, wherein the collar includes a bent portion that is located adjacent a distal end of a latch base of the latching mechanism when the collar is secured to the module housing, and wherein unlocking of the latching bail mechanism causes the distal end of the latch base to abut an end of the bent portion of the collar, and wherein abutment of the distal end of the latch base with the end of the bent portion of the collar causes the latch base to pivot on the end of the bent portion, and wherein the pivoting of the latch base on the end of the bent portion causes the latch lock pin of the latching bail mechanism to be retracted.

4. A method for providing EMI shielding in an optical transceiver module comprising:

providing an EMI collar configured to be secured to a housing of the optical transceiver module, the EMI collar having an opening formed therein that is configured to allow a latch lock pin of a latching mechanism of the transceiver module to be inserted through and retracted through the opening; and securing the EMI collar to the module housing, and wherein the configuration of the EMI collar includes one or more electrically conductive elements that provide one or more electrically conductive pathways between the module housing and a cage when the EMI collar is secured to the housing and the optical transceiver module is contained within the cage, wherein the collar includes a bent portion that is located adjacent a distal end of a latch base of the latching mechanism of the transceiver module, and wherein unlocking of the latching bail mechanism causes the distal end of the latch base to abut an end of the bent portion of the collar, and wherein abutment of the distal end of the latch base with the end of the bent portion of the collar causes the latch base to pivot on the end of the bent portion, and wherein the pivoting of the latch base on the end of the bent portion causes the latch lock pin of the latching bail mechanism to be retracted.

5. The method of claim 4, wherein said one or more electrically conductive elements of the EMI collar include one or more electrically conductive fingers that project inwardly toward the module housing, and wherein the inwardly projecting fingers are spaced apart at predetermined fixed spatial intervals about a circumference of the EMI collar such that if the module is inserted into a cage, the inwardly projecting fingers provide electrically conductive pathways between the module housing and the cage.

6. The method of claim 4, wherein said one or more electrically conductive elements of the EMI collar include spring fingers that are spaced apart at predetermined fixed spatial intervals about a circumference of the EMI collar, each spring finger having a fold formed therein that biases a tip of the spring finger into electrically conductive contact with the module housing, and wherein if the optical transceiver module having the EMI collar secured thereto is contained within a cage, each fold is in electrically conductive contact with the cage.

7. The method of claim 6, wherein said one or more electrically conductive elements of the EMI collar include one or more electrically conductive bumps, and wherein if the optical transceiver module is contained within a cage, said one or more electrically conductive bumps are in contact with a latch of the cage.

8. An electromagnetic interference (EMI) system for use with an optical transceiver module, the EMI system comprising:

an EMI collar configured to be secured to a housing of the optical transceiver module, the EMI collar having an opening formed therein that is configured to allow a latch lock pin of a latching mechanism of the transceiver module to be inserted through and retracted through the opening; and wherein the configuration of the EMI collar includes one or more electrically conductive elements that provide one or more electrically conductive pathways between the module housing and a cage if the EMI collar is secured to the housing and the optical transceiver module is contained within the cage, wherein said one or more electrically conductive elements of the EMI collar include one or more electrically conductive bumps, and wherein if the EMI collar is secured to the housing of the transceiver module and the optical transceiver module is contained within a cage, said one or more electrically conductive bumps are in contact with a latch of the cage.

9. The EMI system of claim 8, wherein the EMI collar has four sides that form a continuous circumference.

10. The EMI system of claim 8, wherein said one or more electrically conductive elements of the EMI collar include one or more electrically conductive fingers that project inwardly toward the module housing when the collar is secured to the housing, and wherein the inwardly projecting fingers are spaced apart at predetermined fixed spatial intervals about a circumference of the EMI collar such that when the collar is secured to the module housing and the module is inserted into a cage, the inwardly projecting fingers provide electrically conductive pathways between the module housing and the cage.

11. The EMI system of claim 8, wherein the collar includes a bent portion that is located adjacent a distal end of a latch base of the latching mechanism of the transceiver module, and wherein unlocking of the latching bail mechanism causes the distal end of the latch base to abut an end of the bent portion of the collar, and wherein abutment of the distal end of the latch base with the end of the bent portion of the collar causes the latch base to pivot on the end of the bent portion, and wherein the pivoting of the latch base on the end of the bent portion causes the latch lock pin of the latching bail mechanism to be retracted.

* * * * *